United States Patent [19]
Yagi et al.

[11] Patent Number: 5,178,440
[45] Date of Patent: Jan. 12, 1993

[54] ANTISKID BRAKE CONTROL METHOD

[75] Inventors: Isao Yagi; Takashi Kushiyama; Ryuta Sugawara, all of Higashimatsuyama, Japan

[73] Assignee: Jidosha Kiki Co., Ltd., Tokyo, Japan

[21] Appl. No.: 765,761

[22] Filed: Sep. 26, 1991

[30] Foreign Application Priority Data

Oct. 9, 1990 [JP] Japan ................................ 2-270895

[51] Int. Cl.$^5$ .............................................. B60T 8/32
[52] U.S. Cl. ..................................... 303/102; 303/61; 303/110; 303/116.1; 303/119.1
[58] Field of Search ................... 303/91, 100, 110, 61, 303/111, 118, 95, 97, 102, 103, 104, 105, 106, 107, 108, 109, 113 TR, DIG. 5, DIG. 6, 119 R, 116 R, 116 SP, 116 WP, 113 R; 188/181 A; 364/426.02, 426.03

[56] References Cited

U.S. PATENT DOCUMENTS

| | | | |
|---|---|---|---|
| 3,936,096 | 2/1976 | Cumming | 303/118 X |
| 4,111,497 | 9/1978 | Carp et al. | 303/110 |
| 4,153,307 | 5/1979 | Goebels | 303/119 R |
| 4,807,133 | 2/1989 | Shimanuki et al. | 303/105 X |
| 4,842,343 | 6/1989 | Akiyoshi et al. | 303/105 X |
| 4,881,784 | 11/1989 | Leppek | 303/104 X |
| 4,883,327 | 11/1989 | Farr | 303/61 X |
| 4,912,641 | 3/1990 | Kuwana et al. | 303/110 X |
| 4,938,544 | 7/1990 | Braschel et al. | 303/105 X |
| 4,962,824 | 10/1990 | Hagiya et al. | 303/105 X |
| 4,997,236 | 3/1991 | Naito et al. | 303/110 X |
| 5,026,127 | 6/1991 | Arikawa | 303/119 R X |

FOREIGN PATENT DOCUMENTS

| | | | |
|---|---|---|---|
| 1914765 | 10/1970 | Fed. Rep. of Germany | 303/105 |
| 2717383 | 11/1978 | Fed. Rep. of Germany | 303/105 |
| 0312258 | 12/1988 | Japan | 303/110 |
| 9008681 | 8/1990 | World Int. Prop. O. | 303/103 |

*Primary Examiner*—Douglas C. Butler
*Attorney, Agent, or Firm*—Varndell Legal Group

[57] ABSTRACT

When skidding of a wheel is detected at braking of the wheel, a passage changeover valve is changed over to allow a brake fluid within a brake cylinder to escape to a low-pressure accumulator, thereby reducing the pressure within the brake cylinder. In addition, by driving a pump, the brake fluid, which has accumulated in the low-pressure accumulator, is fed under pressure to circulate this brake fluid to a brake fluid passage between the master cylinder and the passage changeover valve. When wheel velocity recovers a predetermined amount, the passage changeover valve is changed over, thereby supplying the brake fluid from the pump to the brake cylinder so as to increase the pressure of the brake cylinder again. When the wheel velocity of the braked wheel has recovered to a predetermined wheel velocity, brake hydraulic pressure is generated a predetermined number of times in pulsed fashion, after which the brake hydraulic pressure is increased again. As a result, the brake pedal can be caused to move slowly, and the amount of brake-pedal movement can be reduced, even when the vehicle is traveling on a road surface having a low coefficient of friction (a low $\mu$).

5 Claims, 5 Drawing Sheets

ANTISKID BRAKE CONTROL METHOD

BACKGROUND OF THE INVENTION

This invention relates to an antiskid brake control method for controlling the skidding of wheels of an automotive vehicle by repeatedly decreasing and increasing brake hydraulic pressure at the time of braking. More particularly, the invention relates to an antiskid brake control method for reducing movement of a brake pedal during antiskid brake control.

In general, antiskid brake control involves detecting skidding of a wheel at braking, eliminating skidding when this is detected by reducing the braking force acting upon the wheel, and then subsequently increasing the braking force, thereby stabilizing steering of the vehicle and making the braking distance as short as possible.

One example of an antiskid brake control apparatus for performing such brake control is of the kind shown in FIG. 4, which comprises an add-on four-channel, four-solenoid system.

As illustrated in FIG. 4, the brake circuit to which this antiskid brake control apparatus is applied is formed as a dual-system arrangement comprising a first brake system A and a second brake system B. Since the first and second brake systems A, B have the same construction and operate in the same manner, the first brake system A will be described below and a description of the second brake system B is deleted.

In the antiskid brake control circuit shown in FIG. 4, a case will be considered in which antiskid brake control as performed conventionally is applied. Under ordinary conditions, flow-control valves 6, 7 each comprising a mechanical valve and passage changeover valves 8, 9 each comprising a solenoid valve are in the states illustrated in FIG. 4. Accordingly, brake hydraulic pressure produced in an oil chamber 1a of a master cylinder 1 at the time of braking is introduced to front- and rear-wheel cylinders 2, 4 through supply passages 3, 5 and the valves 6, 7, 8, 9. As a result, braking is applied to a right front wheel FR and a left rear wheel RL.

If, by way of example, wheel velocity $V_{wf}$ of the right front wheel FR attains a first threshold value $\alpha$, which is decided based upon quantities related to wheel skidding, such as slip factor and wheel deceleration, and it is detected that the right front wheel FR is in a skidding state, the solenoid of the first passage changeover valve 8 is energized by the detection signal. As a result, the position of the first passage changeover valve 8 is changed over to shut the supply passage 3 communicating the oil chamber 1a and the front-wheel cylinder 2 and communicate the front-wheel cylinder 2 with a low-pressure accumulator (sump) 10. Consequently, the brake fluid inside the front-wheel cylinder 2 flows out to the low-pressure accumulator 10 so that there is a decline in the brake hydraulic pressure of the front-wheel cylinder 2, as illustrated in FIG. 1(b).

The brake fluid which has flowed out to the low-pressure accumulator 10 is fed under pressure by a piston pump 11 and caused to circulate to the oil chamber 1a of the master cylinder 1. By virtue of this operation, the pressure in oil chamber 1a rises and the brake pedal 1b is forced back a slight amount. The driver thus physically senses the fact that antiskid brake control is being carried out. In this case, the pulsation of pump 11 is absorbed by a volume chamber 12 and suppressed by a brake-fluid circulation suppressing orifice 13 so that almost no pulsation is transmitted to the oil chamber 1a.

The brake fluid circulated by the pump 11 acts as pilot pressure upon ports 6a, 7a of the respective first and second flow control valves 6, 7. Since the brake hydraulic pressure of front-wheel cylinder 2 has diminished, the first flow control valve 6 shuts the supply passage 3 owing to the pilot pressure. However, since the brake hydraulic pressure of the rear-wheel cylinder 4 has not declined, the second flow control valve 7 does not shut the supply passage 5 owing to the pilot pressure.

The wheel velocity $V_{wf}$ of the right front wheel FR continues to fall since the braking torque exceeds the rotational torque of the wheel at the start of decay. However, when the hydraulic pressure falls below a predetermined value, the rotational torque of the wheel surpasses the braking torque, whereby the wheel velocity $V_{wf}$ begins to recover. At this time, the brake hydraulic pressure continues to decline. In particular, as indicated by the solid line in FIG. 1(b), brake hydraulic pressure often becomes substantially zero in case of road having a low $\mu$.

When the wheel velocity $V_{wf}$ has recovered to a considerable degree and attains a second threshold value $\beta$ decided based upon a quantity related to vehicle skidding, the first passage changeover valve 8 is changed over to a position at which it communicates the front-wheel cylinder 2 and the oil chamber 1a. Consequently, the brake fluid circulated by the pump 11 is supplied to the front-wheel cylinder 2 while its flow rate is controlled by an orifice 18. The brake hydraulic pressure of the front-wheel cylinder 2 rises again, as indicated by the solid line in FIG. 1(b), and braking force gradually increases.

Thus, antiskid brake control control is carried out owing to a repetitive decrease and increase in the brake hydraulic pressure.

An antiskid brake control operation similar to that described above is performed when the left rear wheel RL skids and also when the left front wheel FL and right rear wheel RR of the second system B skid.

The relationship between brake hydraulic pressure and amount of consumed fluid at vehicle braking generally is as shown in FIG. 5. Specifically, whereas the amount of fluctuation in fluid consumption is small and the amount of fluctuation in brake hydraulic pressure is large for a road surface having a high coefficient of friction (a high $\mu$), the amount of fluctuation in brake hydraulic pressure is small and the amount of fluctuation in fluid consumption is large for a road surface having a low coefficient of friction (a low $\mu$). As a consequence, for a road having a low $\mu$, the amount of fluid consumption is large even if the fluctuation in hydraulic pressure is small. A problem which results is a large amount of movement of the brake pedal 1b, as indicated by the solid line in FIG. 1(c).

SUMMARY OF THE INVENTION

An object of the present invention is to provide an antiskid brake control method whereby the amount of movement of the brake pedal can be held to a minimum at the time of antiskid brake control.

According to the present invention, the foregoing object is attained by providing an antiskid brake control method for repeatedly performing an operation which includes changing over a passage changeover valve to allow escape of brake fluid in a brake cylinder to a sump device, thereby reducing pressure within the brake cylinder, when skidding of a wheel at braking is detected, feeding brake fluid, which has accumulated in the sump device, under pressure to circulate this brake fluid to a brake fluid passage between the master cylinder and the passage changeover valve by driving a pump, and changing over the passage changeover valve when wheel velocity recovers a predetermined amount, thereby supplying the brake fluid from the pump to the brake cylinder so as to increase the pressure of the brake cylinder again, characterized by generating brake hydraulic pressure a predetermined number of times in pulsed fashion when the wheel velocity of a braked wheel recovers to a predetermined wheel velocity, and subsequently increasing the brake hydraulic pressure again.

According to an embodiment of the invention, the wheel is a front wheel and the predetermined wheel velocity is set at a velocity of the front wheel which prevails when an amount of decline in the front-wheel velocity with respect to vehicle velocity becomes 95% of the maximum value of the amount of decline.

According to an embodiment of the invention, the wheel is a rear wheel and the predetermined wheel velocity is set at a velocity of the rear wheel which prevails at the start of a pressure decrease during one cycle of antiskid brake control.

In the antiskid brake control method according to the present invention constructed as set forth above, brake hydraulic pressure is generated a predetermined number of times in pulsed fashion when wheel velocity of the braked wheel recovers to a predetermined wheel velocity owing to a decrease in the brake hydraulic pressure, after which the brake hydraulic pressure is increased again. As a result, some of the brake fluid discharged from the pump is fed intermittently to the brake cylinder. Accordingly, the amount of brake fluid fed to the master cylinder is diminished. Consequently, movement of the brake pedal is slowed and the amount of movement is reduced.

Still other objects and advantages of the invention will in part be obvious and will in part be apparent from the specification. The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1(a), 1(b) and 1(c) illustrate an embodiment of the antiskid brake control method of the present invention as applied to a front wheel, as well as an example of the conventional antiskid brake control method applied to a front wheel, in which FIG. 1(a) is a diagram showing the relative relationship between vehicle velocity and front-wheel velocity, FIG. 1(b) is a diagram showing brake hydraulic pressure, and FIG. 1(c) is a diagram showing the stroke of a brake pedal;

FIGS. 2(a), 2(b) and 2(c) illustrate antiskid brake control, similar to that of FIGS. 1(a), 1(b) and 1(c), applied to a rear wheel, in which FIG. 2(a) is a diagram showing the relative relationship between vehicle velocity and rear-wheel velocity, FIG. 2(b) is a diagram showing brake hydraulic pressure, and FIG. 2(c) is a diagram showing the stroke of a brake pedal;

FIGS. 3(a) and 3(b) illustrate flows for performing the antiskid brake control according to the embodiment, in which FIG. 3(a) is a flowchart of main control and FIG. 3(b) a flowchart of control for reducing pedal movement;

DESCRIPTION OF THE PREFERRED EMBODIMENT

Figure 1A:
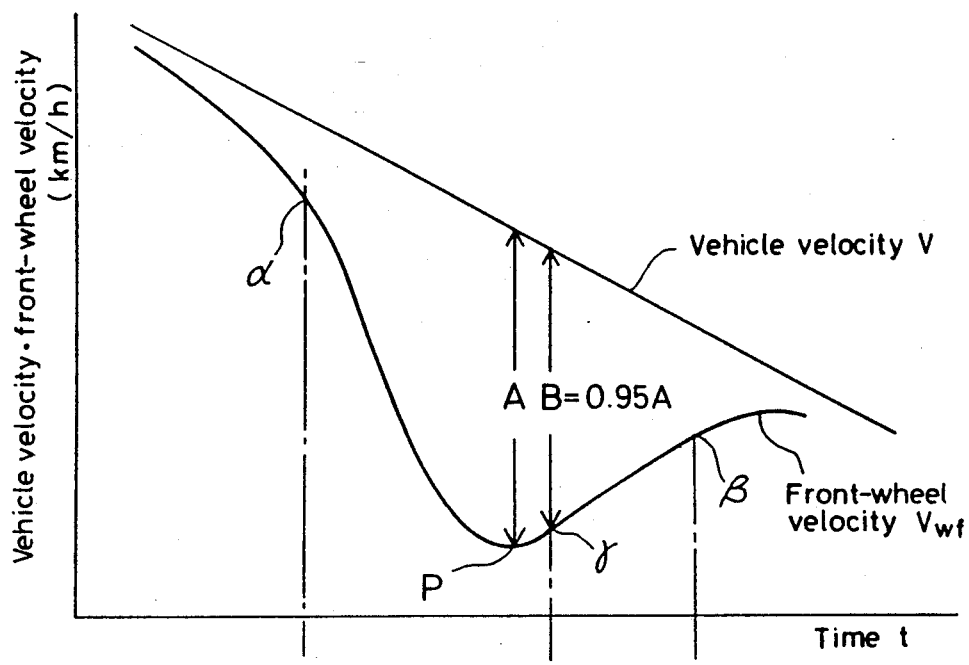
Figure 1B:
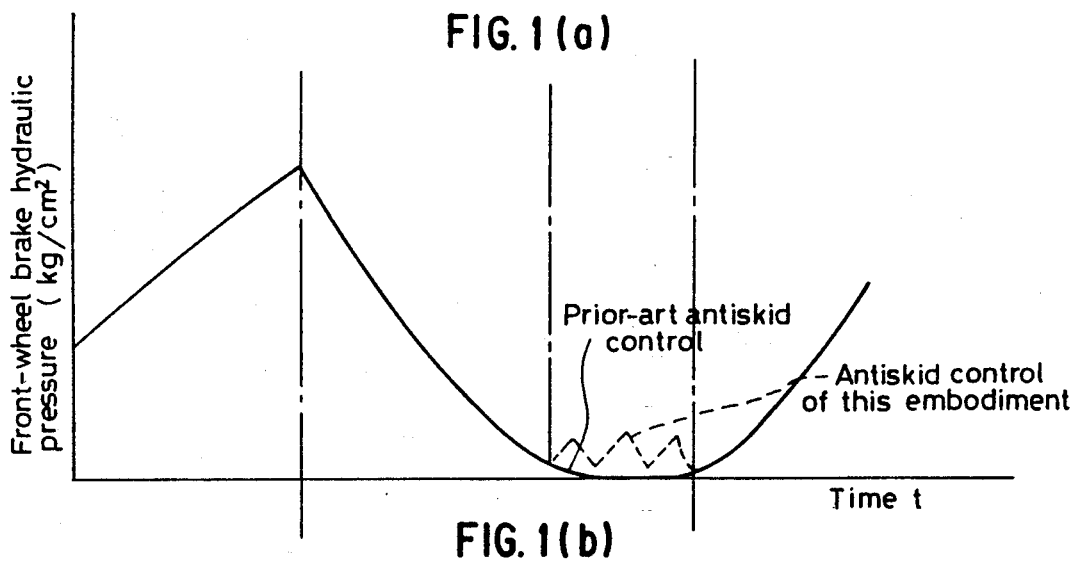
Figure 1C:
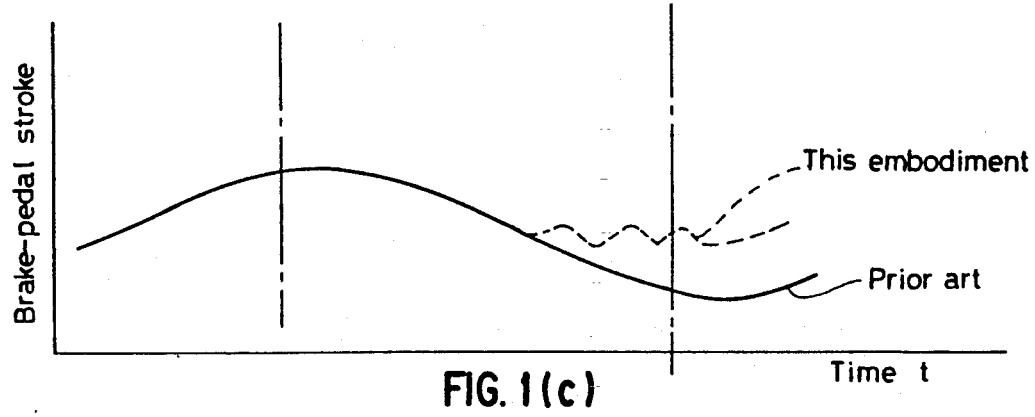

FIGS. 1(a), 1(b) and 1(c) are diagrams illustrating an embodiment for a case where the antiskid brake control method according to the invention is applied to a front wheel. Portions shown by the dashed lines in FIGS. 1(a), 1(b) and 1(c) indicate curves in accordance with the embodiment. The solid-line portions corresponding to those of the dashed lines indicate the antiskid brake control method generally carried out. Solid-line portions that have no corresponding dashed-line portions are common to both the antiskid brake control method of this embodiment and that of the prior art.

Antiskid brake control of the embodiment is carried out in the same manner as common antiskid brake control of the prior art until the front-wheel velocity $V_{wf}$ declines and reaches a point P of maximum drop owing to a decrease in brake hydraulic pressure, as illustrated by the solid line in FIG. 1(b). When the front-wheel velocity $V_{wf}$ attains a third threshold value $\gamma$ of an amount of drop B which is 95% of maximum drop A, the brake hydraulic pressure is generated a predetermined number of times in pulsed fashion, as indicated by the dashed line in FIG. 1(b). The reason for setting the timing position at which the pulsed brake hydraulic pressure is produced at a position where the front-wheel velocity $V_{wf}$ becomes 95% of maximum velocity drop A is to take error into consideration and generate the pulsed brake hydraulic pressure after the wheel velocity has begun to recover with certainty. The pulsed brake hydraulic pressure is produced by alternately repeating the operation of changing over the passage changeover valves 8, 9 in pulsed fashion to feed the brake fluid, circulated by the pump 11, to the brake cylinders 2, 4, and the operation of discharging the brake fluid of brake cylinders 2, 4 to the low-pressure accumulator 10. The range of pulsed brake hydraulic pressure in this case is set at a range at which it will not affect recovery of vehicle velocity $V_{wf}$.

When the wheel velocity $V_{wf}$ attains the second threshold value $\beta$ through control the same as ordinary antiskid brake control according to the prior art, brake hydraulic pressure is increased again. Hereinafter, control for generating the pulsed brake hydraulic pressure is carried out in the same manner also in the next cycle of antiskid brake control.

Figure 2A:
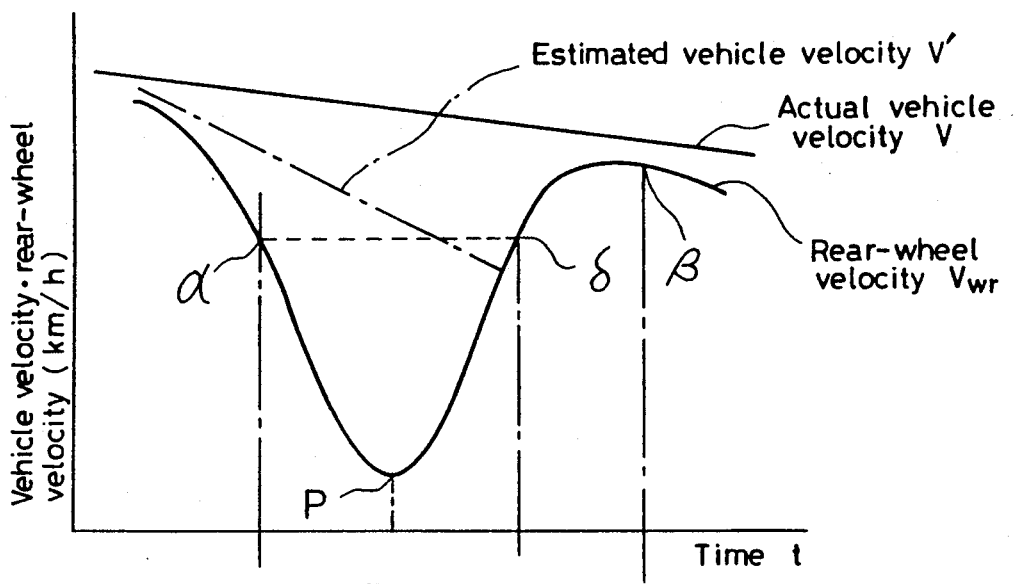
Figure 2B:
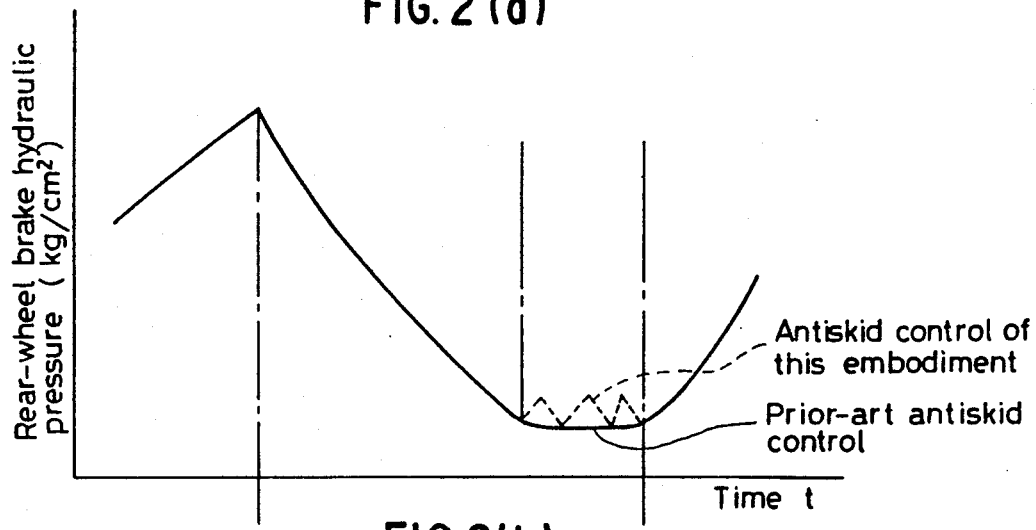
Figure 2C:
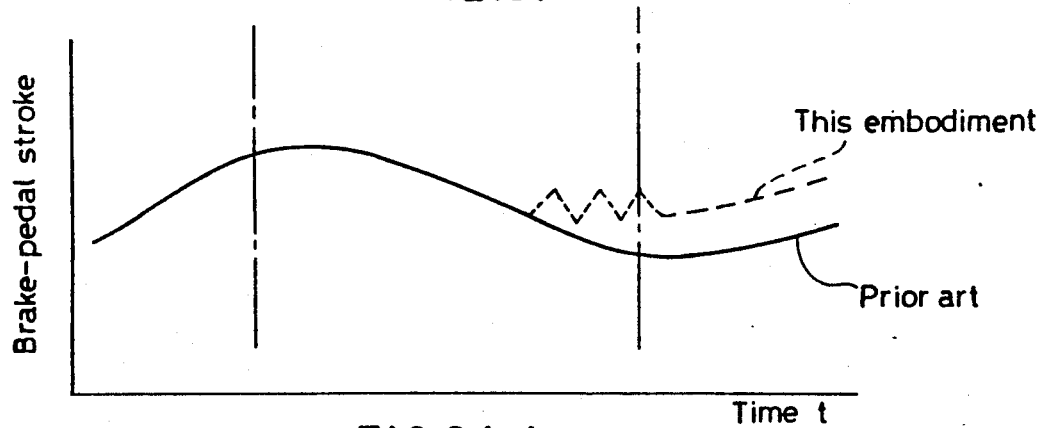

FIGS. 2(a), 2(b) and 2(c) are diagrams showing an embodiment for a case where the antiskid brake control method of the invention is applied to a rear wheel. Portions identical with those of FIGS. 1(a), 1(b) and 1(c) for the front wheel are designated by like reference characters.

In rear-wheel braking, skidding easily occurs owing to a decrease in rear-wheel load. For this reason, the arrangement is such that the percentage of the rise in brake hydraulic pressure is reduced from a certain prescribed pressure by a proportioning valve (P valve). Accordingly, antiskid brake control is performed for the rear wheel as well.

More specifically, in a case where the vehicle is traveling on a low-μ road, the slope of the decrease in the actual vehicle velocity V is gentler than the slope of the decrease in estimated vehicle velocity V' in terms of calculation, as illustrated in FIG. 2(a). When the rear-wheel velocity $V_{wr}$ attains the first threshold value α, a decrease in the brake fluid pressure begins. As a result, a transition is made to recovery when the rear-wheel velocity $V_{wr}$ passes the point P of maximum decline. In this case, the actual vehicle velocity V does not decline that much, and hence there are instances where the rear-wheel velocity $V_{wr}$ makes a recovery to the wheel velocity which prevailed at the start of decay.

Accordingly, in rear-wheel antiskid brake control in the conventional antiskid brake control for a rear wheel, the reduced pressure condition last until the rear wheel velocity $V_{wr}$ reaches a second threshold value β determine by the slip factor as shown by the solid line in FIG. 2(b), and brake pressures again increase thereafter.

By contrast, in accordance with this embodiment, when the rear-wheel velocity $V_{wr}$ attains a fourth threshold value δ, which is a point in time at which the velocity has recovered to a velocity the same as that which prevailed at the start of decay, namely a velocity the same as that at the first threshold value α, the brake hydraulic pressure is generated in a predetermined pulsed form, as indicated by the dashed line in FIG. 2(b). When a rear-wheel velocity $V_{wr}$ attains the second threshold value β, the brake hydraulic pressure is increased again.

Figure 3B:
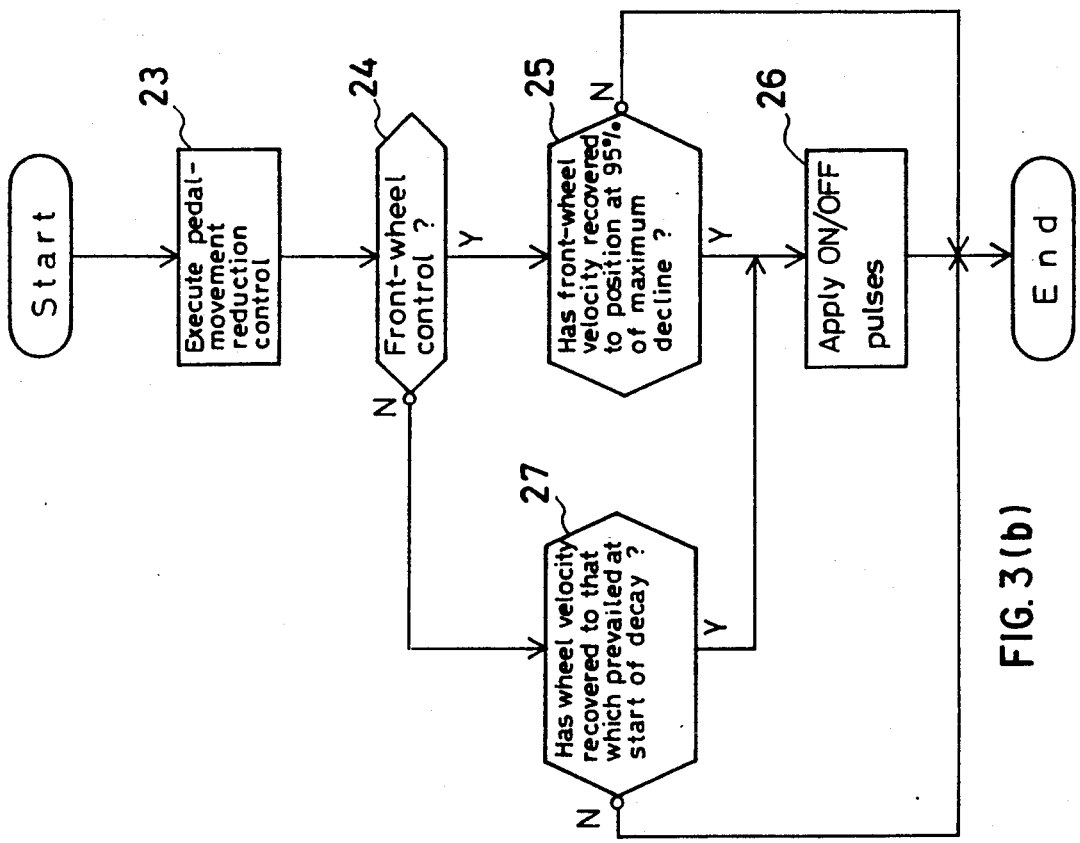
Figure 3A:
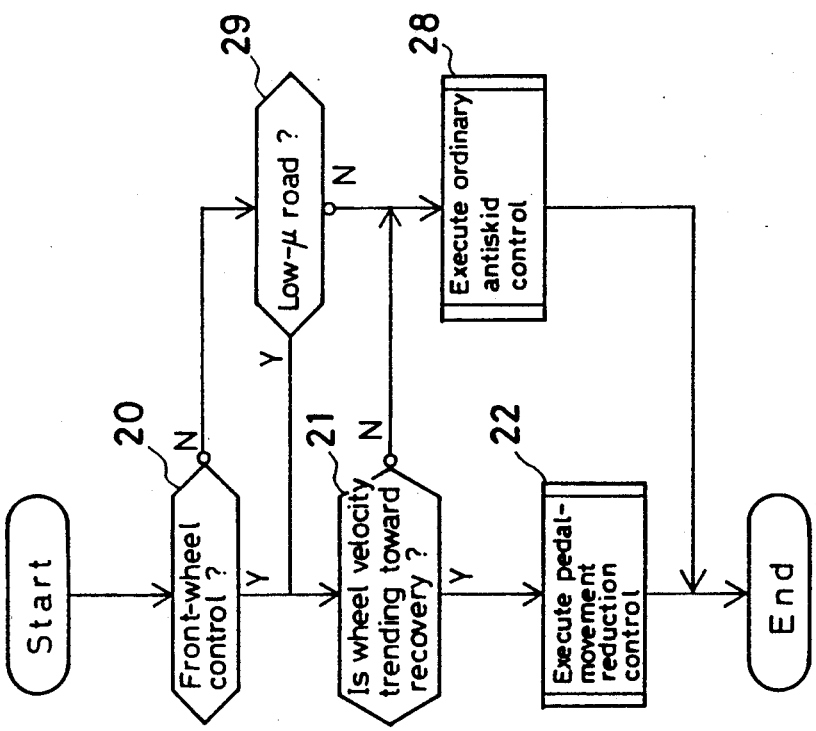
Figure 4:
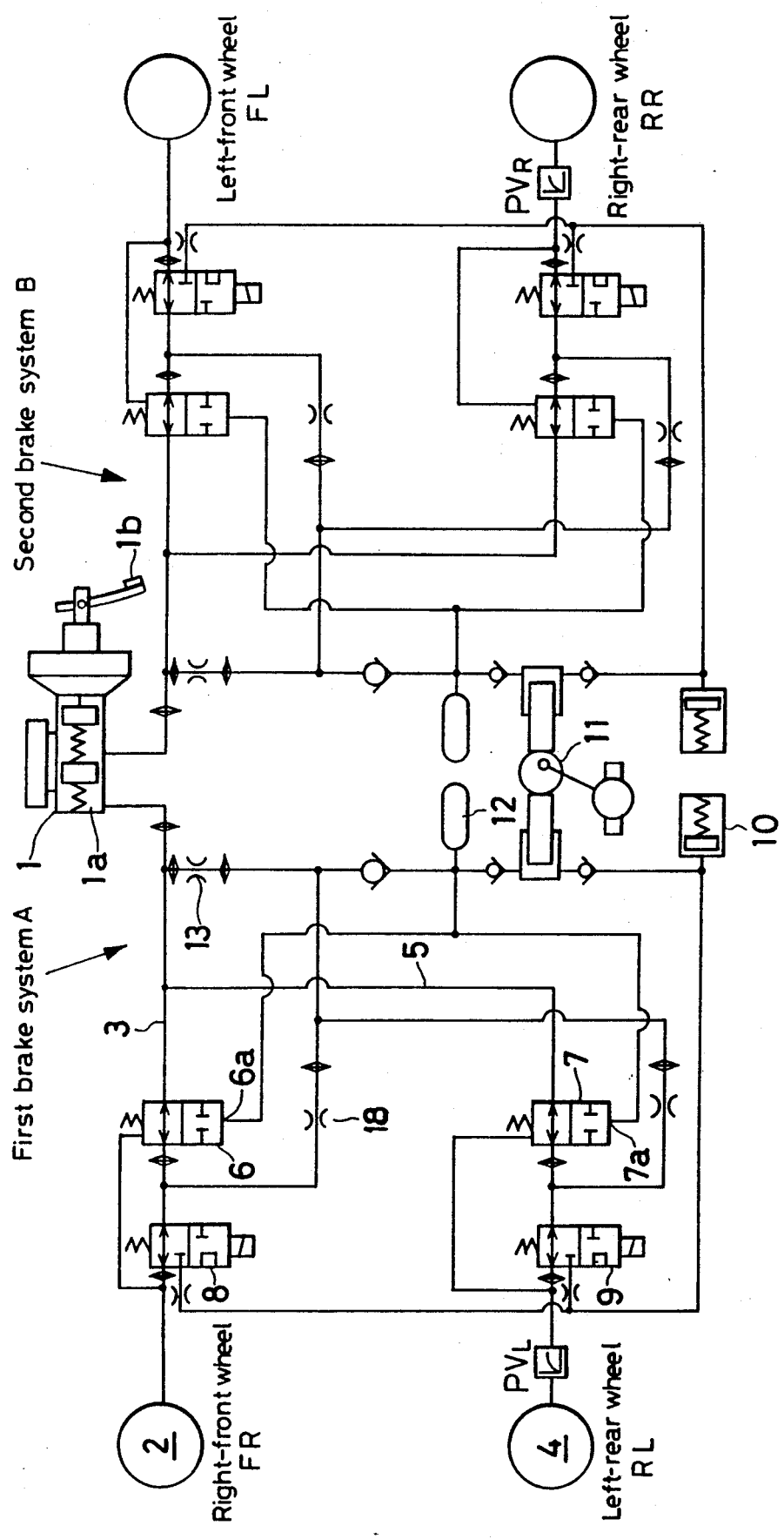
FIG. 4 is a diagram illustrating an antiskid brake control system to which the embodiment is applied.

FIGS. 3(a) and 3(b) are diagrams illustrating flows for performing such antiskid brake control.

As shown in FIG. 3(a), it is determined at step 20 whether antiskid brake control of the front wheel is being carried out during the decay phase. In a case where antiskid brake control of the front wheel is being carried out, it is determined at step 21 whether wheel velocity is trending toward recovery. If vehicle velocity is trending toward recovery, then a subroutine for control to reduce pedal movement is executed at step 22.

In the subroutine for control to reduce pedal movement, as shown in FIG. 3(b), control for reducing pedal movement is started at step 23, and it is determined at step 24 whether front-wheel antiskid brake control is being carried out. In case of front-wheel antiskid brake control, it is determined at step 25 when the front-wheel velocity $V_{wf}$ has attained the third threshold value γ, which is 95% of the maximum decline in velocity. If the front-wheel velocity $V_{wf}$ has attained the velocity of the third threshold value γ, an on/off signal in the form of a predetermined number of pulses is applied at step 26 to the passage changeover valve corresponding to the wheel undergoing antiskid brake control, as a result of which a pulsed brake hydraulic pressure is generated a predetermined number of times in the wheel cylinder of this wheel. After the predetermined number of pulses of the brake hydraulic pressure have been generated, the subroutine for controlling the reduction in pedal movement is ended.

If it is determined at step 24 that front-wheel antiskid brake control is not in effect, this means that rear-wheel antiskid brake control is being carried out. Accordingly, it is determined at step 27 whether the wheel velocity $V_{wr}$ of the rear wheel undergoing antiskid brake control has recovered to the fourth threshold value δ, namely the wheel velocity which prevailed at the start of the decrease in pressure (i.e., at the start of decay). If the wheel velocity $V_{wr}$ has recovered to that which prevailed at the start of decay, then the processing from step 26 onward is executed. If the wheel velocity $V_{wr}$ has not recovered to that which prevailed at the start of decay, then the subroutine for controlling reduction of pedal movement is ended without generation of the pulsed brake hydraulic pressure.

On the other hand, if the front-wheel velocity $V_{wf}$ is not trending toward recovery at step 21, then a subroutine for the conventionally performed ordinary antiskid brake control, which is indicated by the solid line in FIG. 1(a), is executed at step 28. If will suffice if the flow of the subroutine for controlling ordinary antiskid brake control is of the well-known type, and therefore a description thereof is deleted.

Further, in a case where front-wheel antiskid brake control is not performed at step 20, this means that rear-wheel antiskid brake control is being performed. In this case, it is determined at step 29 whether the road surface on which the vehicle is traveling has a low μ. In case of a low-μ road surface, processing from step 21 onward is executed. If the road surface does not have a low μ, processing from step 28 onward is executed.

Figure 5:
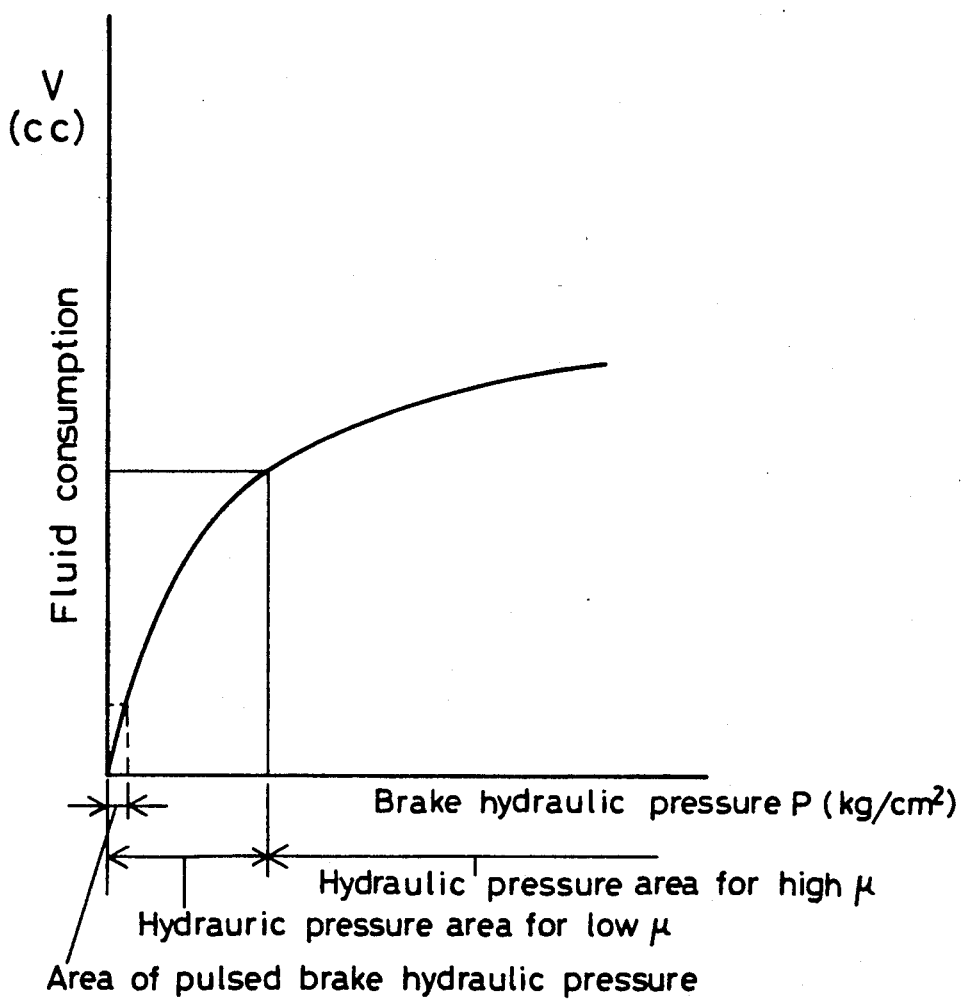
FIG. 5 is a diagram showing the relationship between brake hydraulic pressure and amount of fluid consumption according to road-surface conditions.

In the antiskid brake control method of the embodiment constructed as set forth above, the pulsed brake hydraulic pressure is generated a predetermined number of times when the front-wheel velocity $V_{wf}$ attains the third threshold value γ or when the rear-wheel velocity $V_{wr}$ attains the fourth threshold value δ. Since some of the brake fluid discharged from the pump 11 at this time is fed into the wheel cylinder, the stroke of the brake pedal 1b becomes as shown by the dashed lines in FIG. 1(c) and FIG. 2(c). Accordingly, the pedal stroke according to this embodiment is such that pedal movement becomes less than that in the pedal stroke in conventional antiskid brake control indicated by the solid lines in FIG. 1(c) and FIG. 2(c). In this case, the pulsed brake hydraulic pressure is generated in a low-pressure region where there is little influence upon the brake hydraulic pressure, as illustrated in FIG. 5. As a result, there is no influence upon the performance of antiskid brake control and the amount of pedal movement is reduced.

In the antiskid brake control method according to the present invention, as evident from the foregoing description, hydraulic pressure is generated in pulsed form at recovery of wheel velocity. As a result, the brake pedal can be caused to move slowly, and the amount of pedal movement can be reduced, even when the vehicle is traveling on a low-μ road surface. This makes it possible to obtain an improved pedal feeling.

As many apparently widely different embodiments of the present invention can be made without departing from the spirit and scope thereof, it is to be understood that the invention is not limited to the specific embodiments thereof except as defined in the appended claims.

What is claimed is:

1. A method for reducing brake pedal movement during antiskid brake control in an automotive vehicle, comprising the steps of:
   repeating a cycle of decreasing and increasing brake fluid pressure in a brake cylinder of a wheel by operating a changeover valve for said brake cylinder for draining said brake fluid from said brake cylinder upon detection of a first wheel velocity indicating wheel skidding and increasing said brake fluid to said brake cylinder upon detection a second wheel velocity indicating recovery of wheel velocity, said brake fluid is feed to a sump device during said draining thereof and then recirculated under pressure of a pump to a brake fluid passage arranged between a master cylinder and said changeover valve, and detecting a third wheel velocity for each said cycle corresponding to a wheel velocity less than said second wheel velocity and upon detecting said third wheel velocity intermittently operating said changeover valve for supplying said brake fluid recirculated by said pump under pressure to said brake cylinder in a pulsating manner, so that said brake pedal movement is reduced by reducing an amount of said brake fluid drained from said brake cylinder.

2. The method according to claim 1, wherein said wheel is a front wheel and said third wheel velocity is set at a velocity of said front wheel which prevails when an amount of decline in front-wheel velocity with respect to velocity of said vehicle becomes 95% of a maximum value of said decline in front-wheel velocity.

3. The method according to claim 1, wherein said wheel is a rear wheel and said third wheel velocity is set at a velocity of said rear wheel which prevails at a start of a pressure decrease during one said cycle.

4. The method according to claim 1, wherein said supplying of said brake fluid recirculated by said pump to said brake cylinder in a pulsating manner does not effect said recovery of wheel velocity.

5. The method according to claim 1, wherein said third wheel velocity is detected after detection of said first wheel velocity and before detection of said second wheel velocity.

* * * * *